(12) United States Patent
Thacker et al.

(10) Patent No.: US 10,929,881 B1
(45) Date of Patent: Feb. 23, 2021

(54) PRE-FEATURE PROMOTION SYSTEM

(71) Applicant: GROUPON, INC., Chicago, IL (US)

(72) Inventors: David Thacker, Burlingame, CA (US); Amit Aggarwal, Sunnyvale, CA (US); Kevin Chang, Mountain View, CA (US)

(73) Assignee: Groupon, Inc., Chicago, IL (US)

( * ) Notice: Subject to any disclaimer, the term of this patent is extended or adjusted under 35 U.S.C. 154(b) by 23 days.

(21) Appl. No.: 13/756,145

(22) Filed: Jan. 31, 2013

Related U.S. Application Data

(60) Provisional application No. 61/593,262, filed on Jan. 31, 2012.

(51) Int. Cl.
    *G06Q 30/02* (2012.01)

(52) U.S. Cl.
    CPC .................. *G06Q 30/0254* (2013.01)

(58) Field of Classification Search
    USPC ............................................. 705/14
    See application file for complete search history.

(56) References Cited

U.S. PATENT DOCUMENTS

| | | | |
|---|---|---|---|
| 2001/0032128 A1* | 10/2001 | Kepecs ........................... | 705/14 |
| 2002/0042738 A1* | 4/2002 | Srinivasan et al. ............. | 705/14 |
| 2002/0169655 A1* | 11/2002 | Beyer ................ | G06Q 30/0204 705/7.33 |
| 2005/0209921 A1* | 9/2005 | Roberts ................. | G06Q 30/02 705/14.13 |
| 2008/0033784 A1* | 2/2008 | Chalimadugu ......... | H04L 67/02 705/7.29 |
| 2008/0183859 A1* | 7/2008 | Aaron .................... | G06Q 30/02 709/224 |
| 2009/0070129 A1* | 3/2009 | Inbar ...................... | G06O 30/02 705/317 |
| 2009/0150218 A1* | 6/2009 | Brunner et al. ................ | 705/10 |
| 2009/0271266 A1* | 10/2009 | Regmi ............... | G06O 30/0235 705/14.44 |
| 2010/0287103 A1* | 11/2010 | Mason .................... | G06Q 30/02 705/80 |
| 2011/0078026 A1* | 3/2011 | Durham ............. | G06O 30/0269 705/14.66 |
| 2011/0112892 A1* | 5/2011 | Tarantino ............... | G06Q 30/02 705/14.1 |
| 2011/0276392 A1* | 11/2011 | Vaver ..................... | G06O 30/02 705/14.43 |
| 2011/0313840 A1* | 12/2011 | Mason ............... | G06O 30/0235 705/14.35 |

(Continued)

OTHER PUBLICATIONS

U.S. Appl. No. 61/695,857.

*Primary Examiner* — Gautam Ubale
(74) *Attorney, Agent, or Firm* — Alston & Bird LLP

(57) ABSTRACT

A promotion offering system and method is disclosed. The promotion offering system and method selects consumers for a test promotion that has one or more attributes, and is configured to generate test data for multiple consumer groupings. The promotion offering system and method may use the test data in analyzing whether to send a promotion to a consumer. For example, the promotion offering system and method may use one algorithm to generate a list of ranked promotions, and may use the test data in order to adjust the list of ranked promotions (such as replacing a highest ranked promotion with another promotion).

16 Claims, 10 Drawing Sheets

(56) References Cited

U.S. PATENT DOCUMENTS

| | | | |
|---|---|---|---|
| 2012/0078706 A1* | 3/2012 | Rajagopalan | 705/14.41 |
| 2012/0109751 A1* | 5/2012 | Binenstock | G06Q 30/0261 705/14.58 |
| 2012/0166267 A1* | 6/2012 | Beatty | G06Q 30/0219 705/14.21 |
| 2012/0220277 A1* | 8/2012 | Gonynor | G06Q 30/02 455/414.2 |
| 2013/0054359 A1* | 2/2013 | Ross | G06Q 30/00 705/14.53 |

* cited by examiner

PRE-FEATURE PROMOTION SYSTEM

REFERENCE TO RELATED APPLICATION

This application claims the benefit of U.S. Provisional Application No. 61/593,262, filed Jan. 31, 2012, the entirety of which is hereby incorporated by reference herein.

TECHNICAL FIELD

The present description relates to offering promotions associated with a product or a service. This description more specifically relates to pre-featuring promotions for a product or a service.

BACKGROUND

Merchants typically offer promotions to consumers. The promotions offered may be in the form of discounts, rewards, or the like. When offering the promotions, a merchant may seek to focus the offer to a subset of its consumers. In order to select those consumers in the subset, the merchant may analyze data generated from similar promotions. Given the size of the data generated from similar promotions, this analysis may prove unwieldy.

SUMMARY

A promotion offering system and method is disclosed.

In one aspect, a method for selecting consumers to receive an offer for a promotion from a promotion program is provided. The method includes: selecting an initial set of consumers, from a set of consumers, to receive the offer for the promotion, the initial set of consumers comprising a representative distribution across multiple values of a consumer attribute; sending an offer for the promotion to consumers in the initial set of consumers; receiving feedback with respect to one or more of the offers sent; generating probabilities of acceptance of the offer using the received feedback; and selecting a subsequent set of consumers, from the set of consumers, to receive the offer for the promotion, the subsequent set of consumers selected based, at least in part, on the generated probability for a respective consumer in the subsequent set of consumers.

For example, the initial set of consumers may be randomly selected. As another example, the initial set of consumers may be selected based on a probability analysis. More specifically, one or more pre-feature promotions and one or more full-feature promotions may be scored (or may have another type of probability of acceptance by the consumer generated). The pre-feature promotion may be offered to the consumer if the score of the pre-feature promotion is higher than or is within a delta of a highest score of the full-feature promotions. After examining the available consumer profiles with the delta, if fewer than the number of consumers desired to receive the pre-feature promotion is selected, then the delta is increased and the available consumer profiles not yet selected to receive the pre-feature promotion may be analyzed again.

Further, the number of consumers in the initial set of consumers may be predetermined, or may be dynamically determined. In addition, the consumers selected to be in the initial set of consumers may be based on one attribute, or multiple attributes. The attribute(s) may be based on attributes of the pre-feature promotion, attributes of the consumers, or a combination of attributes of both the pre-feature promotion and attributes of the consumer. One example attribute is distance from the location of the pre-feature promotion. So that, an attribute of the pre-feature promotion (location of the promotion) and an attribute of the consumers (home or work location of the respective consumer) may be used to calculate a distance between the pre-feature promotion location and the respective consumer's location. More specifically, the location attribute may be divided into buckets, such as consumers that are 0-2 miles from the pre-feature location, consumers that are 2-4 miles from the pre-feature location, consumers that are 4-6 miles from the pre-feature location, etc. So that, the consumers selected for the initial set of consumers may comprise a certain number (either predetermined or dynamically determined) for some, or all of the different buckets for the location attribute. In this way, the selection of consumers across the different buckets may be a representative distribution across multiple values of the location attribute.

The offers for the pre-feature promotion may generate feedback, which may be used in determining whether to send consumers an offer for a full-feature promotion (such as the full-feature promotion that has the same or similar attributes as the pre-feature promotion). For example, the feedback from one or more of the offers sent for the pre-feature promotion may be used with feedback from other historical promotion programs having at least one common promotion attribute with the full-feature promotion program.

In another aspect, a promotion offering system is provided. The promotion offering system is configured to select consumers to receive an offer for a promotion from a promotion program and includes: a database configured to store consumer information; a communication interface; and a processor in communication with the database and the communication interface. The processor may be configured to: select an initial set of consumers, from a set of consumers, to receive the offer for the promotion, the initial set of consumers comprising a representative distribution across multiple values of a consumer attribute; send, via the communication interface, an offer for the promotion to consumers in the initial set of consumers; receive feedback with respect to one or more of the offers sent; generate probabilities of acceptance of the offer using the received feedback; and select a subsequent set of consumers, from the set of consumers, to receive the offer for the promotion, the subsequent set of consumers selected based, at least in part, on the generated probability for a respective consumer in the subsequent set of consumers.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The promotion system may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

Figure 1:
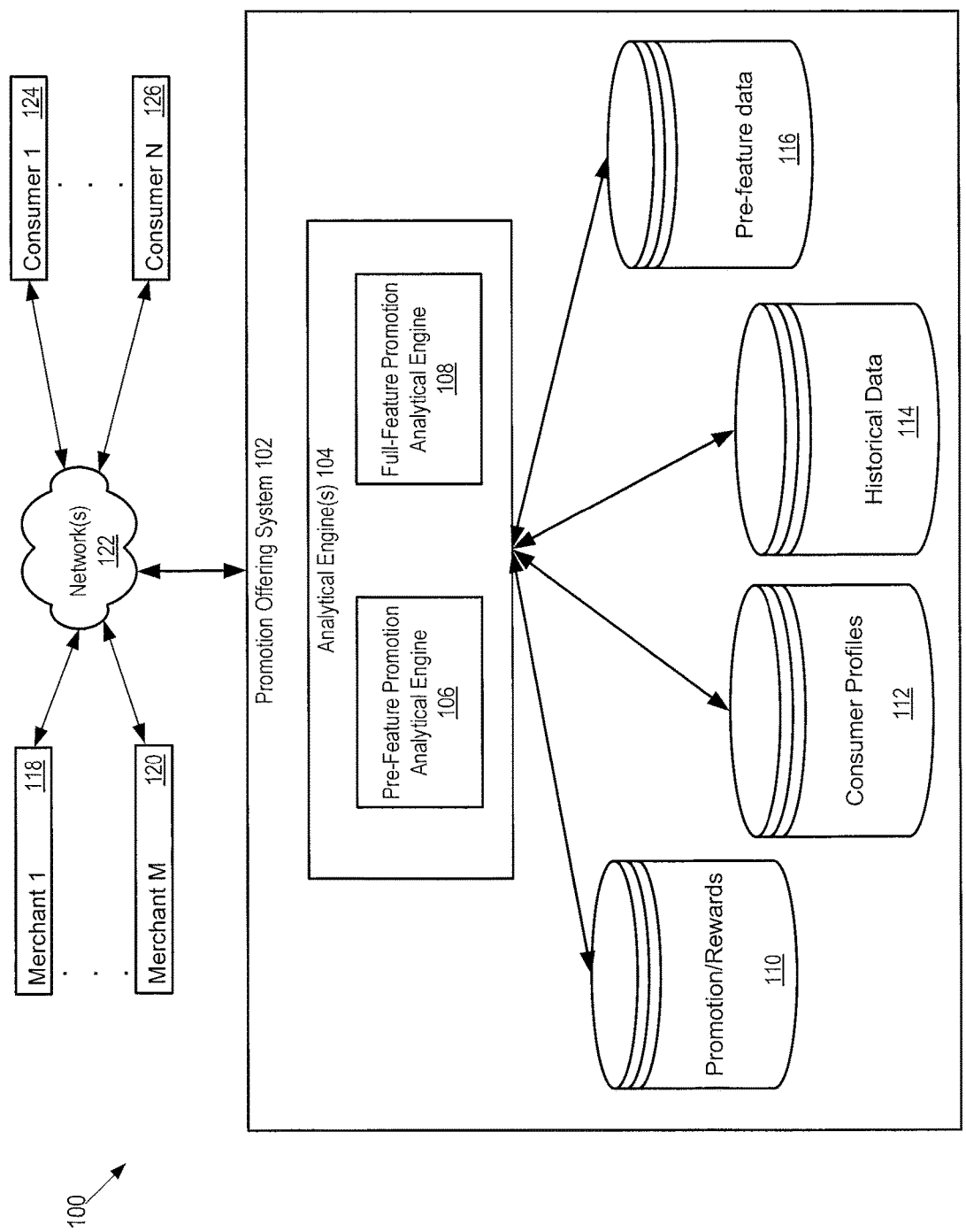
FIG. 1 shows a representation of the promotion system for offering a promotion.

FIG. 1 illustrates a promotion system 100 for offering promotions to consumers. A promotion may include any type of reward, discount, coupon, credit, deal, voucher or the like used toward part (or all) of the purchase of a product or a service. The promotion may be part of a promotion program, which may include, without limitation, promotion attributes for the deal program.

Examples of promotion attributes include, without limitation: the store or website at which the promotion is offered; an amount discounted; a period (after the promotion is purchased or accepted) when the promotion is valid for use; a deal type (discussed in U.S. Application No. 61/695,857, incorporated by reference herein in its entirety); a number of units for the promotion program (e.g., an inventory of 100 hard goods, or 100 available promotion offers for a $40 reduction in the cost of a dinner); and a number of offers (or impressions) for deals (e.g., 100 offers to consumers of the promotion deal for $40 reduction in the cost of a dinner).

The consumer attributes may include, but are not limited to: the consumer's name; consumer's age; consumer's address (such as the consumer's home address and/or the consumer's work address); consumer's occupation; consumer's educational background; consumer's previously accepted and/or rejected promotion program offerings; consumer's gender; consumer's preferred deal types (discussed in U.S. Application No. 61/695,857); and the like.

As discussed in more detail below, different types of promotions may be offered including: (1) pre-feature promotions; and (2) full-feature promotions. A pre-feature promotion is designed as a test promotion to generate test data in order to test or investigate at least one attribute associated with the pre-feature promotion or associated with the consumer. The pre-feature promotion may include one or more attributes, such as a location for the promotion, amount of promotion (e.g., number of units), deal type of the promotion, or the like. As discussed in more detail below, the test promotion is configured to generate test data for multiple consumer groupings. The multiple consumer groupings may be based on one or more attributes of the test promotion, based on one or more attributes of the consumer, or based on a combination of the attribute(s) of the test promotion and the attribute(s) of the consumer. For example, multiple consumer groupings may be specified based on distance of the consumer to the test promotion (e.g., 0-2 miles from the location of the promotion, 2-4 miles from the location of the promotion, etc.). So that, the attribute of the test promotion (location of the promotion) and the attribute of the consumer (e.g., home location or work location of the consumer) may be used to calculate the distance of the consumer to the test promotion, and assign the consumer to the respective consumer grouping. As another example, multiple consumer groupings may be specified based on an attribute of the consumers, such as gender, age, economic status, or the like (e.g., 20-29 years of age, 30-39 years of age, etc.).

As discussed in more detail below, the promotion offering system 102 is configured to select consumers for the pre-feature promotion so that the consumers selected in the multiple groupings exhibit a pre-determined distribution of values for the tested attribute. In this way, the consumers selected represent a control population that exhibit the pre-determined distribution of values. The promotion offering system 102 may select, for example, a representative distribution of consumers across one or more consumer attributes, one or more promotion attributes, or any combination thereof.

In the example of a pre-feature promotion that tests for the geographical distance attribute, the promotion offering system 102 may determine the potential values of the tested attribute (such as 0-2 miles from the promotion, 2-4 miles from the promotion, 4-6 miles from the promotion, etc.), and select consumers that exhibit the potential values for the geographical distance attribute. In one aspect, the number of consumers selected for some (or all) of the potential values for the tested attribute (such as the geographic distance attribute) may be evenly distributed. So that, the pre-feature promotion may test a representative number of consumers in some or all the values of the tested attribute. For example, multiple groupings based on distance may comprise 0-2 miles, 2-4 miles, 4-6 miles, 6-8 miles, 8-10 miles, and greater than 10 miles. Further, the number of consumers in each of the multiple groupings may be a predetermined number, or may be dynamically determined. In one embodiment, a predetermined number of consumers (such as 3,000 consumers) may be selected for some or all of the multiple groupings. For example, 3,000 consumers may be selected for each of only three groupings: consumers that reside 0-2 miles from the pre-feature promotion, 3,000 consumers that reside 2-4 miles from the pre-feature promotion, and 3,000 consumers that reside 4-6 miles from the pre-feature promotion. As another example, 3,000 consumers may be selected for each of the five groupings. In an alternate embodiment, the number of consumers in each of the multiple groupings may be dynamically determined, and may be dependent on one or more statistical methodologies. For example, the number of consumers may be selected to be a minimum number to achieve a predetermined level of statistical accuracy that is based on the pre-feature data. More specifically, the offers provided to the consumers generate feedback in the form of pre-feature data. So that, the minimum number selected to generate the pre-feature data is dependent on the predetermined level of statistical accuracy desired.

Likewise, the pre-feature promotion may test for two or more attributes in combination (such as multiple consumer attributes or multiple attributes related to the test promotion). For example, the pre-feature promotion may test for the age attribute and gender attribute. Consumers may be selected that exhibit various values of ages, such as 15-24, 25-34, 35-44, etc., for both genders. For example, the promotion offering system 102 may generate groupings for females aged 15-24, females aged 25-34, females aged 35-44, males aged 15-24, males aged 25-34, males aged 35-44, etc. The number of consumers selected for each of the groupings (e.g., females aged 35-44) may be a predetermined number for an even distribution across the different groupings.

In this way, a single attribute (either of the test promotion or of the consumer) may be used to generate the multiple consumer groupings (e.g., age of the consumer). Alternatively, multiple attributes of the test promotion and/or of the consumer may be used to generate the multiple consumer groupings.

The promotion offering system may record the consumers' response to the offers for the pre-feature promotion. The response to the promotion, in the form of feedback, may take several forms including without limitation: acceptance of the offer (e.g., a purchase of the pre-feature promotion), a rejection of the offer, a consideration of the offer (such as a consumer's opening of an email containing the offer for the pre-feature promotion; the consumer's clicking on the link in the email to access the webpage for the offer for the pre-feature promotion), or a lack of consideration of the offer (failure to open an email with the offer of the pre-feature promotion or failure to clink on a link to the webpage containing the offer for the pre-feature promotion). The feedback may be correlated to the test attribute (or tested attributes) for later use with the full-feature promotion. For example, if the tested attribute is distance from the promotion location, the different types of feedback may be correlated with the multiple groupings (e.g., X % accepted the offer in 0-2 miles, Y % considered the offer in 0-2 miles, Z % failed to consider the offer in 0-2 miles).

The full-feature promotion may be similar to the pre-feature promotion in certain aspects, and vary from the pre-feature promotion in one or more aspects. Likewise, the promotion offering system 102 may use data generated from the pre-feature promotion to determine which consumers to target for the full-feature promotion, as discussed in more detail below. As one example, the pre-feature promotion may be run prior to the issuance of the full-feature promotion (such as the day before the full-feature promotion).

As one example, the descriptions of a pre-feature promotion and the corresponding full-feature promotion may be the same, while the implementations of the pre-feature promotion and its corresponding full-feature promotion may be different. In particular, the pre-feature promotion and the corresponding full-feature promotion may identify the same merchant for the promotion, the same amount of the discount, etc. Moreover, implementation of the pre-feature promotion may be different from its corresponding full-feature promotion in one or more aspects, such as the number of consumers targeted, the distribution of consumers targeted, etc. In the geographic example described above, the pre-feature promotion targeted 3,000 consumers in some or all of the values of geographic distance (0-2 miles, 2-4 miles, etc.). In implementing the corresponding full-feature promotion, a greater number of consumers may be targeted (e.g., the number of consumers targeted may be an order of magnitude higher than that targeted in the test promotion, such as 30,000), and a different distribution of consumers for a particular grouping (such as focusing on consumers 2-4 miles from the promotion, instead of selecting representative consumers in each of the values of geographic distance).

The promotion system 100 includes promotion offering system 102, which communicates via one or more network(s) 122 with consumers, such as consumer 1 (124) to consumer N (126), and with merchants, such as merchant 1 (118) to merchant M (120). In one embodiment, the promotion offering system 102 communicates with consumers via a single channel (such as by a push-type email). Alternatively, the promotion offering system 102 may communicate with consumers via different channels, such as a push-type email or a pull-type search of an Internet server. In this way, the promotion offering system 102 may use network(s) to communicate with consumers in different ways.

The promotion offering system 102 includes analytical engine 104, which may include one or more analytical engines. As shown in FIG. 1, analytical engine 104 includes a pre-feature promotion analytical engine 106 and a full-feature promotion analytical engine 108. FIG. 1 shows separate analytical engines for pre-feature promotions and full-feature promotions; however, FIG. 1 is merely for illustration purposes. The functionality of the analytical engines may be performed by different computers or by the same computer.

The analytical engines communicate with multiple databases, such as promotion/rewards database 110, consumer profiles database 112, historical data database 114, and pre-feature data database 116. The promotion/rewards database 110 includes data that describes available pre-feature promotions and full-feature promotions. The consumer profiles database 112 includes profiles for the consumer 1 (124) through consumer N (126). The profiles may include various types of data including, but not limited to, name, age, address, occupation, educational background, previous accepted promotions, previous rejected promotions, and the like. The historical database 114 includes data related to full-feature promotions (including completed and on-going promotions), including rates of acceptances of promotions, attributes of consumers that accepted or rejection promotions, and the like. The pre-feature data database 116 includes data related to pre-feature promotions, including rates of acceptances of promotions, attributes of consumers that accepted or rejection promotions, and the like. The pre-feature data database 116 may store feedback data related to pre-feature promotions, which may include any data related to a consumer response to receiving a pre-feature promotion. Feedback data related to a pre-feature promotion may include acceptance rate and/or a degree a consumer considered the offer, which may vary according to the channel through which the pre-feature promotion is offered to the consumer. For example, when a pre-feature promotion is offered to a consumer through e-mail, the feedback data may include whether the consumer opened an e-mail containing the pre-feature promotion or clicked on a link to the pre-feature promotion, the amount of time considering the pre-feature promotion offer, whether the consumer downloaded images embedded in the e-mail, and more. FIG. 1 shows separate databases for promotions/rewards, consumer profiles, historical data, and pre-feature data; however, FIG. 1 is merely for illustration purposes. The data may be arranged in one or more memories.

Figure 2A:
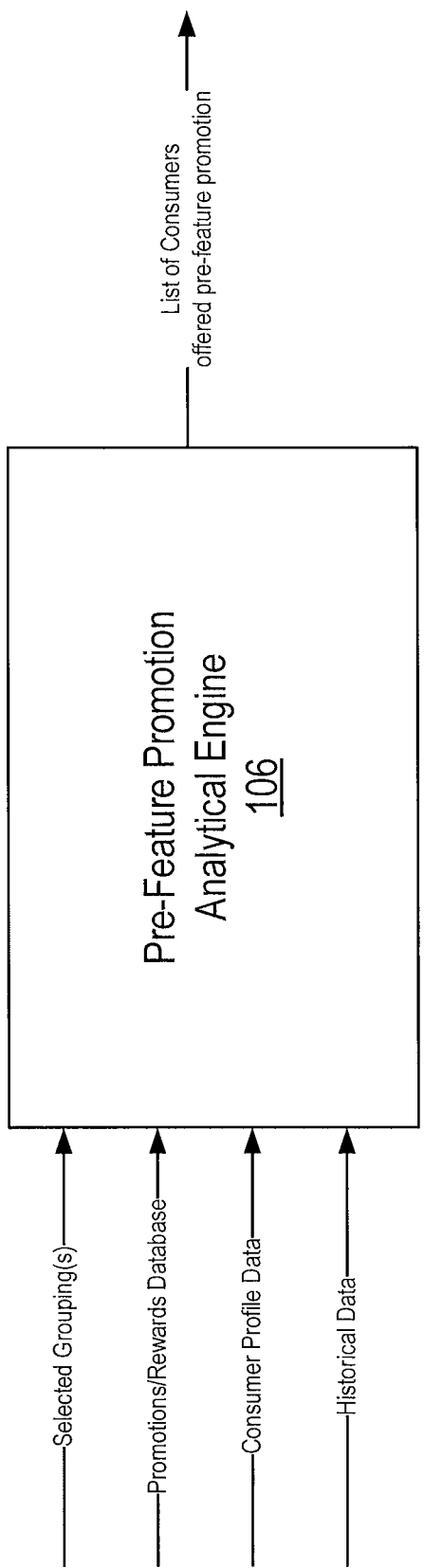
FIG. 2A shows a block diagram of the pre-feature promotion analytical engine.

FIG. 2A shows a block diagram of the pre-feature promotion analytical engine 106. As shown in FIG. 2A, the pre-feature promotion engine 106 includes inputs for selected grouping(s), which identifies the multiple groupings for analysis by the pre-feature promotion analytical engine 106. As discussed above, one example of an attribute is the geographical location, which may result in multiple groupings or multiple buckets of consumers based on distance to the geographical location of the promotion. The pre-feature promotion analytical engine 106 further receives input from the promotions/rewards database 110. The promotions/rewards database 110 includes a listing of the various promotions available, including details associated with one or more pre-feature promotions. Thus, the pre-feature promotion analytical engine 106 may receive the details from the pre-feature promotion at issue from the promotions/rewards database 110. Further, the pre-feature promotion analytical engine 106 may access one or more consumer profiles from the consumer profiles database 112 and historical data from the historical data database 114 in order to determine which consumers to offer the pre-feature promotion to, as discussed in more detail below.

Figure 2B:
FIG. 2B shows a block diagram of the full-feature promotion analytical engine.

FIG. 2B shows a block diagram of the full-feature promotion analytical engine 108. As shown in FIG. 2A, the full-feature promotion analytical engine 108 receives input from the promotions/rewards database 110, including details associated with one or more full-feature promotions. Further, the full-feature promotion analytical engine 108 may access one or more consumer profiles from the consumer profiles database 112 and historical data from the historical data database 114 in order to determine which consumers to offer the full-feature promotion to. In addition, the full-feature promotion analytical engine 108 receives pre-feature data, which includes data generated from one or more pre-feature promotions, in order to determine which consumers to, as discussed in more detail below.

Figure 3:
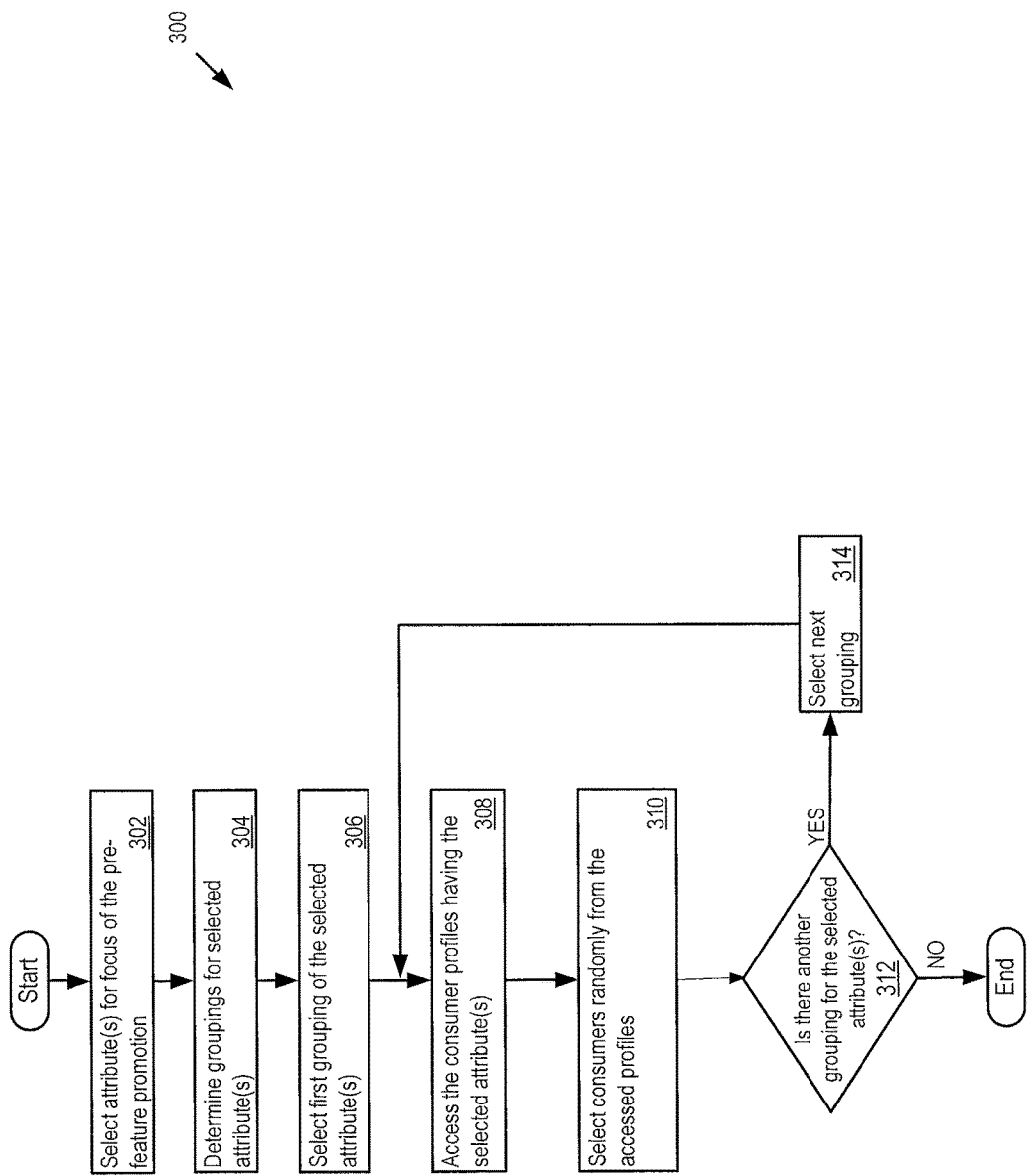
FIG. 3 shows one example of a logic flow of the pre-feature promotion logic used by the promotion offering system to determine which consumers to offer the pre-feature promotion.

FIG. 3 shows one example of a logic flow 300 of the pre-feature promotion logic used by the promotion offering system to determine which consumers to offer the pre-feature promotion. At 302, one or more attributes are selected for the focus of the pre-feature promotion. As discussed above, the attribute may be related to the test promotion itself (such as the geographic location of the promotion) and/or may be related to consumer attributes (such as age, gender, etc.). At 304, groupings are determined for the selected attribute(s). As discussed above, a single attribute, such as gender or age, may be selected. In response to the selection, multiple ranges or groupings associated with the selected attribute may be determined, such as 0-2 miles, 2-4, miles, etc. Further, multiple attributes may be selected. In response to the selection of multiple attributes, multiple ranges or groupings associated with the selected attributes may be determined, such as groupings for females aged 15-24, females aged 25-34, females aged 35-44, males aged 15-24, males aged 25-34, males aged 35-44, etc.

At 306, a first grouping is selected for the selected attribute(s). The promotion offering system 102 seeks to send the pre-feature promotion to a pre-determined distribution of consumers for each of the groupings, such as an equal distribution of consumers across the multiple groupings. At 308, consumer profiles that have the selected attribute(s) are accessed. For example, if the selected attribute is 2-4 miles from the test promotion location, consumer profiles that have an associated home or work location 2-4 miles from the test promotion location are accessed.

At 310, the consumers are randomly selected from the accessed profiles. The number of consumers may be static and predetermined, or may be dynamically determined. In one embodiment, the promotion offering system accesses a memory location to determine the predetermined number. After which, a number of profiles equal to the predetermined number are randomly selected. In an alternate embodiment, the number of consumers may vary and may be dynamically determined, as discussed above. After the number of consumer is dynamically determined, a number of profiles equal to the dynamically determined number are randomly selected. As one example, a random number table may be used to select the consumers randomly. More specifically, each of the accessed consumer profiles may be numbered (such as 1 to 100,000). If 3,000 is the number of consumers for random selection from the grouping, 3,000 unique numbers (in the range of 1 to 100,000) may be selected, with each of the 3,000 numbers selected representing one of the consumer profiles. As another example, a random number generator may be used to select the consumers randomly. The predetermined number may be a set number (such as 3,000) that is equal for some or all of the multiple groupings. At 312, it is determined whether there is another grouping for the selected attribute(s). If so, at 314, the logic flow 300 loops back to 308. For example, if the grouping for the selected attribute is consumers 2-4 miles from the test promotion location and another grouping is consumers 4-6 miles from the test promotion location, the logic flow 300 iterates.

Figure 4:
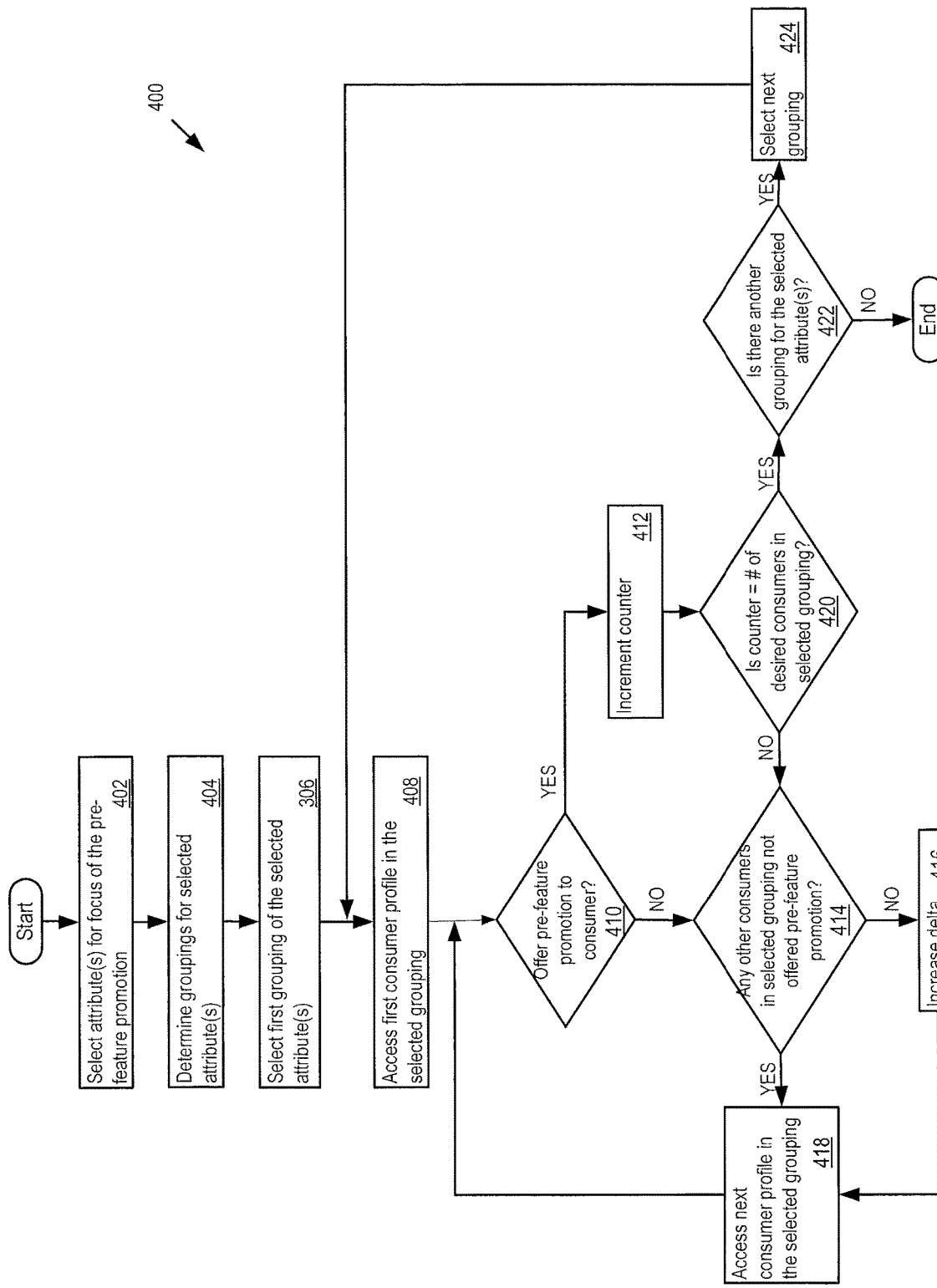
FIG. 4 shows another example of a logic flow of the pre-feature promotion logic used by the promotion offering system to determine which consumers to offer the pre-feature promotion.

FIG. 4 shows another example of a logic flow 400 of the pre-feature promotion logic used by the promotion offering system 102 to determine which consumers to offer the pre-feature promotion. At 402, one or more attributes are selected for the focus of the pre-feature promotion. At 404, groupings are determined for the selected attribute(s).

Figure 5:
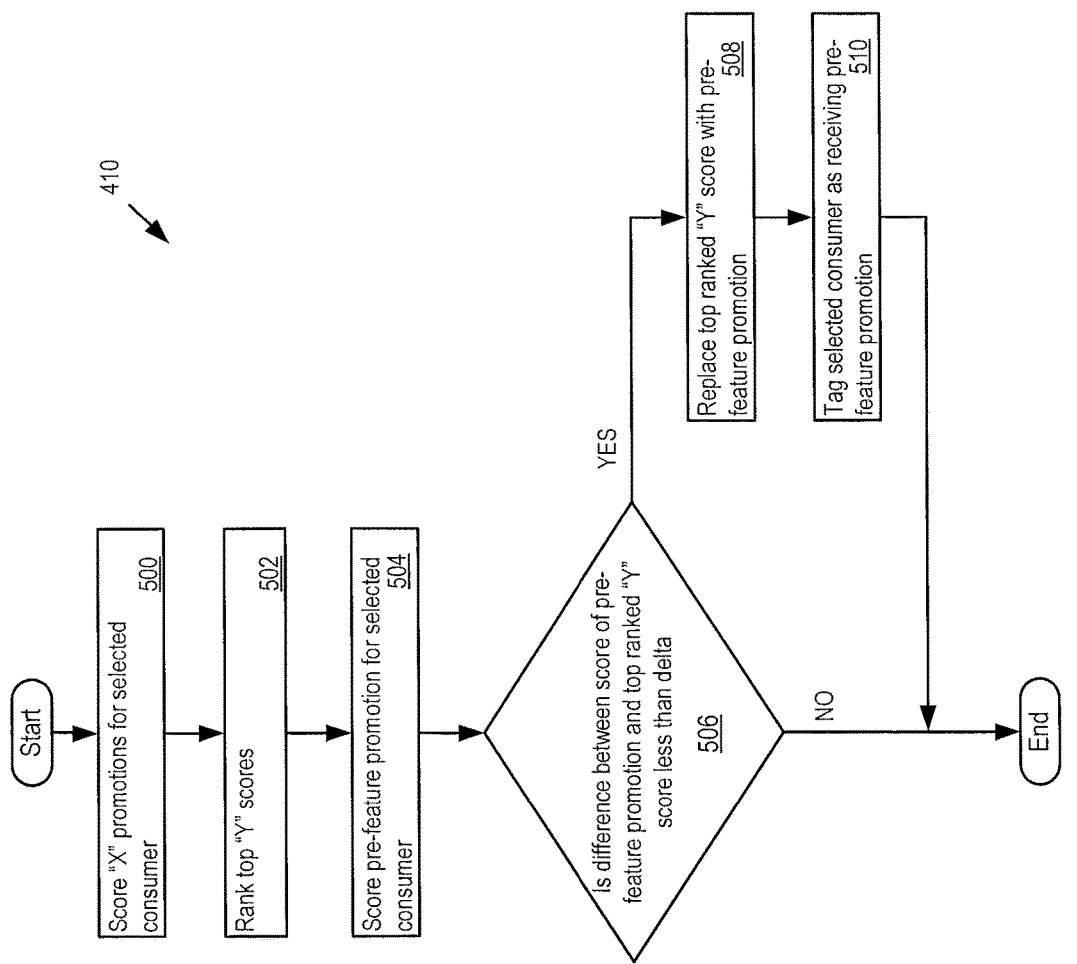
FIG. 5 shows a logic flow of a part of the pre-feature promotion logic illustrated in FIG. 4 in which a single pre-feature promotion is evaluated.
Figure 6:
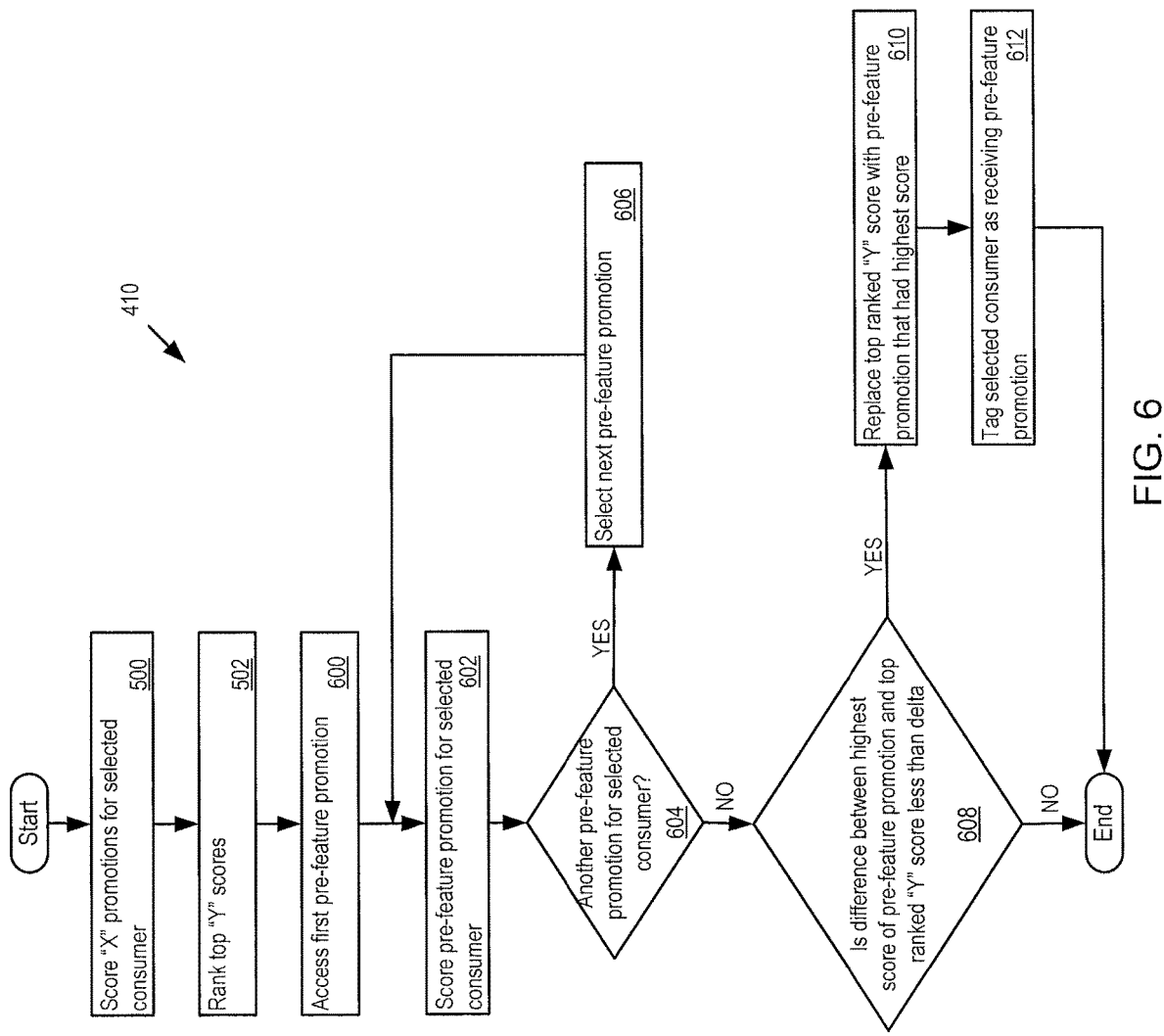
FIG. 6 shows a logic flow of a part of the pre-feature promotion logic illustrated in FIG. 4 in which multiple pre-feature promotions are evaluated.

At 406, a first grouping is selected for the selected attribute(s). The promotion offering system 102 seeks to send the pre-feature promotion to a pre-determined distribution of consumers for each of the groupings, such as an equal distribution of consumers across the multiple groupings. At 408, a first consumer profile is accessed in the selected grouping. At 410, it is determined whether to offer the pre-featured promotion to the consumer. FIGS. 5 and 6 describe two different examples of the logic to determine whether to offer the pre-featured promotion to the consumer, as discussed in more detail below. If it is determined to offer the pre-feature promotion to the consumer, at 412, a counter is incremented. At 420, it is determined whether the counter is equal to the number of desired consumers in the selected grouping. The counter may be used to determine whether there is a pre-determined distribution of consumers in each of the grouping of the selected attribute (such as the same number of consumers in each of the ranges of the selected attribute). If the counter is equal to the desired number of consumers in the selected grouping, at 422, it is then determined whether there is another grouping for the selected attribute(s). If there is another grouping, at 424, the next grouping is selected, and the flow diagram loops back to block 408. For example, if the selected attribute is geographic distance and the first selected range is 0-2 miles, the next selected range may be 2-4 miles. If there is not another selected range, at 324, the flow chart 300 ends.

If, at 410, it is determined not to offer the pre-feature promotion to the consumer, at 414, it is determined whether there are any other consumers in the selected grouping not yet considered whether to offer the promotion. If there are other consumers in the selected grouping, at 418, the next consumer profile in the selected grouping is accessed and the flow chart loops back to 410. If it is determined that there are no other consumers in the selected grouping ("No" at block 414), at 416, the delta is increased. As discussed in more detail in FIGS. 5 and 6, the delta is a measure of whether to offer the pre-feature promotion to a consumer. If the consumer is outside of the delta, the consumer is not offered the pre-feature promotion. If there are not enough consumers that have been tagged to be offered the promotion, the delta may be increased, thereby increasing the number of consumers offered the pre-feature promotion.

FIG. 5 shows a logic flow of block 410 of the pre-feature promotion logic 400 in which a single pre-feature promotion is evaluated. At block 500, "X" promotions are scored for the selected consumer. The consumer may be offered full-feature promotions as well as one or more pre-feature promotions. The available full-feature promotions may be scored as a first step in determining which promotion(s) to offer to the consumer. The scoring may be based on historical data, such as: data gathered from the full-feature promotion under consideration (if data has already been gathered on the full-featured promotion under consideration); data gathered from full-feature promotions with similar attributes (such as similar locations, similar rewards, etc.); and data gathered from promotions that the consumer has accepted or rejected. Examples of scoring that may be used are disclosed in greater detail below in connection with the full-feature promotion logic. At 502, the top "Y" scores may be ranked. For example, if 20 full-feature promotions are scored, the top 5 full-feature promotions, according to score, may be ranked.

At 504, the pre-feature promotion for the selected consumer may be scored. Similar to the scoring of the full-feature promotions, the scoring for the pre-feature promotion may be based on historical data, such as data gathered from full-feature promotions with similar attributes and data gathered from promotions that the consumer has accepted or rejected. At 506, it is determined whether the difference between the score of the pre-feature promotion and the top ranked "Y" score is less than "delta". If the difference is less than delta, the ordering of the scores may be changed. For example, at 508, the top ranked "Y" score is replaced by the pre-feature promotion, and at 510, the selected consumer is tagged as receiving the pre-feature promotion.

The promotion offering system 102 seeks to offer pre-feature promotions to consumers. However, the offer of the pre-feature promotions is made using "delta" in order to confirm that the offer is made to a consumer who is, within the "delta", considered likely to be interested in the promotion. As a general matter, the greater the "delta", the less likely the consumer may be interested when offered the pre-feature promotion. Conversely, the smaller the "delta", the more likely the consumer may be interested when offered the pre-feature promotion.

FIG. 6 shows a logic flow 410 of the pre-feature promotion logic 400 in which multiple pre-feature promotions are evaluated. Similar to FIG. 5, at 500, "X" promotions are scored and, at 502, the top "Y" scores are ranked. Thereafter, each of the multiple pre-feature promotions is scored. At 600, the first pre-feature promotion is accessed, and at 602, scored. At 604, it is then determined whether there is another pre-feature promotion to offer to the selected consumer. If so, at 606, the next pre-feature promotion is selected, and the flow diagram loops back to 602. If not, at 608, it is determined whether the difference between the highest score of the pre-feature promotion and the top ranked "Y" score is less than "delta". If the difference is less than delta, the ordering of the scores may be changed. For example, at 610, the top ranked "Y" score is replaced by the pre-feature promotion with the highest score, and at 612, the selected consumer is tagged as receiving the pre-feature promotion.

As discussed above, the pre-feature promotion may be used to generate test data. The pre-feature promotion may include a single variation. Alternatively, the pre-feature promotion may include multiple variations, each with different attributes of the specific pre-feature promotion. Each of these variations may be used as a test promotion during the pre-feature period. The test data generated during the pre-feature period may then be used to choose which of the promotion attributes to select for the full-feature promotion, as discussed below with respect to FIG. 7. As discussed below, the test data generated during the pre-feature period may be used on the first day of offering the full-feature promotion (when there is no feedback data for offers for the full-feature promotion) and may be used on the second and subsequent days of offering the full-feature promotion (when there is feedback data for offers for the full-feature promotion). In one embodiment, the test data generated during the pre-feature period may be combined with the test data generated during the full-feature period. In the example of the distance attribute, acceptances of offers for the pre-feature promotion for consumers 0-2 miles away from the promotion location and acceptances of offers for the full-feature promotion for consumers 0-2 miles away from the promotion location may be combined to create an overall percentage acceptance of offers for consumers 0-2 miles away from the promotion location. This overall percentage acceptance may then be used in the decision whether to offer the promotion to a potential consumer 0-2 miles away from the promotion location. In an alternate embodiment, the test data generated during the pre-feature period is treated differently from the test data generated during the full-feature period.

FIGS. 5 and 6 illustrate using delta in order to determine whether to swap a higher scored deal with a pre-feature deal. Other criteria may be used instead of, or in addition to, the delta illustrated in FIGS. 5 and 6. For example, another decision block may be included whereby if the score of a pre-feature promotion is less than a predetermined score (indicating a low possibility of acceptance by the specific consumer), the pre-feature promotion with the low score is not offered to the specific consumer.

Figure 7:
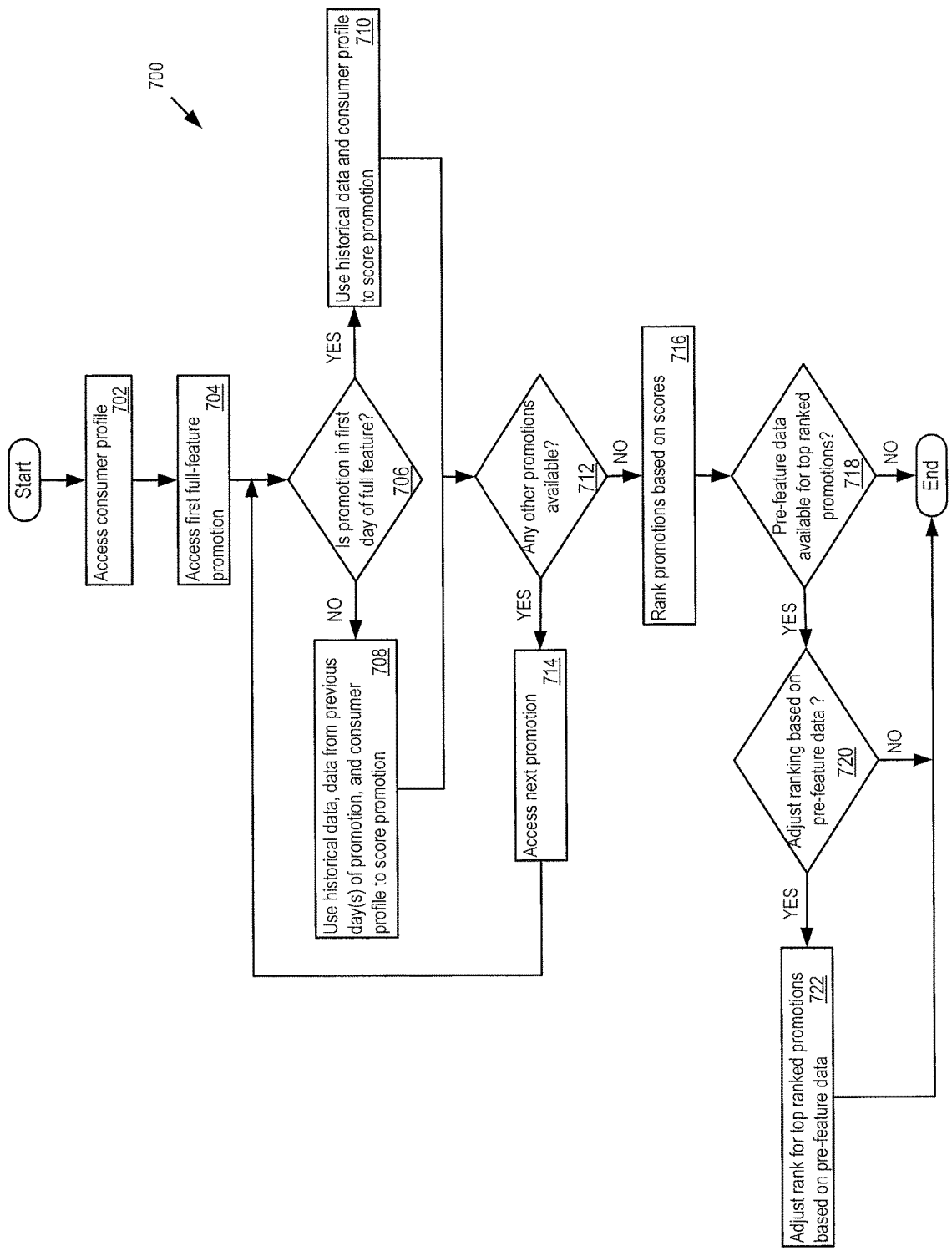
FIG. 7 shows a logic flow of the full-feature promotion logic used by the promotion offering system to determine which consumers to offer the full-feature promotion.

FIG. 7 shows a logic flow 700 of the full-feature promotion logic used by the promotion offering system 102 to determine which consumers to offer the full-feature promotion. As illustrated in FIG. 2B, the full-feature promotion logic may consider data from various sources, including the full-feature promotion under consideration, full-feature promotions similar to the full-feature promotion under consideration, and pre-feature promotions (including the pre-feature promotion that is paired to the full-feature promotion under consideration).

At 702, the consumer profile is accessed. At 704, the first full-feature promotion (the full-feature promotion under consideration) is accessed. At 706, it is determined whether the full-feature promotion under consideration is in its first day of full feature. If yes, at 708, the full-feature promotion under consideration is scored based on historical data (such as data from full-feature promotions similar to the full-feature promotion under consideration) and the consumer profile. In other words, data from previous day(s) of offering the full-feature promotion under consideration is not considered since the full-feature promotion under consideration is in its first day of full offering. Examples of types of historical data used for scoring are disclosed in U.S. application Ser. No. 13/050,771 (published as U.S. Application No. 2011-0313840A1), incorporated by reference herein in its entirety.

If the full-feature promotion under consideration is not in its first day of full offering, at 710, the full-feature promotion under consideration is scored based on historical data (such as data from full-feature promotions similar to the full-feature promotion under consideration), the consumer profile, and/or data generated from previous days of offering the full-feature promotion under consideration. In other words, data from previous day(s) of offering the accessed full-feature promotion may be considered so as to dynamically score the full-feature promotion under consideration over time. For example, data gathered from previous day(s) of offering (such as the conversion rate, other feedback data, or the expected revenue) may indicate that the full-feature promotion under consideration is more successful and should be scored higher than other less successful promotions. Also, data gathered from previous day(s) of offering may indicate a correlation between the success of the full-feature promotion under consideration and one or more attributes of consumers, such as gender or distance from the geographic location for the promotion. In this case, the score for the promotion under consideration may be separately adjusted for different groups of consumers. For example, the data gathered from previous day(s) of offering the promotion may indicate one group of consumers having a particular attribute that has a high correlation with the success of the promotion. The data gathered on the particular attribute, such as gender, distance, etc., may then be used to score the promotion under consideration differently. Further, data gathered from previous day(s) of offering may be used to modify the terms of the promotion. For example, the location for the promotion (e.g., a promotion of a restaurant having multiple locations) may be changed based on the number of consumers within a region that accepted or rejected the promotion, or the amount of the promotion may be changed based on the number of consumers that accepted the promotion.

At 712, it is determined whether there are other full-feature promotions available. If so, at 714, the next full-feature promotion is accessed, and the flow chart loops back to 706. If not, at 716, the full-feature promotions are ranked based on the scores.

At 718, it is determined whether there is pre-feature data available for the top ranked full feature promotions. If so, at 720, it is determined whether to adjust the ranking for the top ranked promotions based on the pre-feature data.

As discussed above, the pre-feature promotion provides a means by which data may be generated for the pre-feature promotion. Measures of the data may comprise expected revenue, conversion rate, and other feedback data. Expected revenue includes data related to the expected percentage of acceptances of the offer multiplied by the revenue generated by acceptance of the offer, thereby providing an indication of the amount of expected revenue if the promotion is offered to a consumer with a particular attribute. Conversion rate is a percentage of acceptances of the offer.

For example, a pre-feature promotion may focus on geographical distance from the promotion as the attribute, as discussed above. After the pre-feature promotion is offered, data (such as feedback data) may be gathered to determine the expected revenue or the conversion rate for different groupings of the geographical distance attribute. This data may be used at 720 to determine whether to modify the rankings of the top ranked full-feature promotions.

Figure 8:
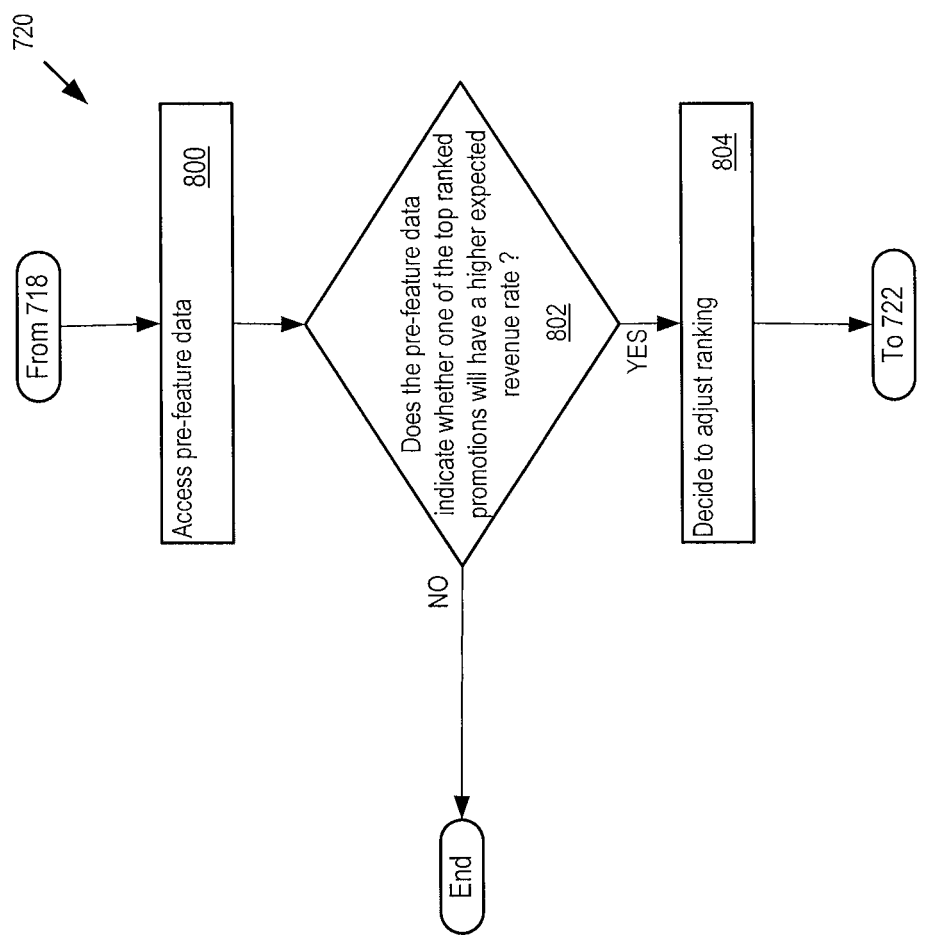
FIG. 8 shows a logic flow of a part of the full-feature promotion logic.

FIG. 8 shows a logic flow 720 of the determination whether to adjust the rankings. At 800, the pre-feature data are accessed. At 802, it is determined whether the pre-feature data indicate whether one of the top ranked promotions will have a preferred result, such as a higher expected revenue rate or a higher conversion rate. If so, at 804, the ranking of the top ranked promotions is adjusted. If not, there is no adjustment of the ranking of the top ranked promotions.

In assessing whether the pre-feature data indicates whether one of the top ranked promotions will have a preferred result, the pre-feature data may be weighted depending on the type of pre-feature data and/or the channel by which the offer for the pre-feature is sent. As discussed above, offers for the pre-feature promotion may be sent to the consumer via different channels. One channel is via push email (e.g., an email containing a description of the offer for the promotion and a link to a website where the customer can purchase the promotion). Another channel is via pull Internet searching (e.g., responsive to a customer's search request submission to a web server, the web server may send a listing of offers, one of which may be the offer for the pre-feature promotion). So that, the pre-feature data may be given more or less weight based on the channel. Further, the consumer's reaction to the offer for the pre-feature promotion generates feedback. The feedback may comprise an acceptance of the offer (e.g., a purchase of the pre-feature promotion), a rejection of the offer, a consideration of the offer (such as a consumer's opening of an email containing the offer for the pre-feature promotion; the consumer's clicking on the link in the email to access the webpage for the offer for the pre-feature promotion; in a listing of website links responsive to a customer's search request submission to the web server, the consumer's clicking on the link to a webpage containing the offer for the pre-feature promotion), or a lack of consideration of the offer (failure to open an email with the offer of the pre-feature promotion or failure to clink on a link to the webpage containing the offer for the pre-feature promotion). Similarly, the pre-feature data may be given more or less weight depending on the feedback. For example, pre-feature data indicating an acceptance of the offer for the pre-feature promotion by a customer with certain attributes may be given greater weight than pre-feature data indicating an opening of an email with the pre-feature promotion.

If it is determined, at 722, the ranking for the top ranked promotions is adjusted based on the pre-feature data. The adjustment of the top ranked promotions may be to replace the top ranked promotion with the promotion that has the pre-feature data associated with it. For example, if there are five top ranked promotions, and the fourth ranked promotion has pre-feature data associated with it that indicates a higher rate of acceptance or expected revenue, the top ranked promotion may be replaced by the fourth ranked promotion.

Figure 9:
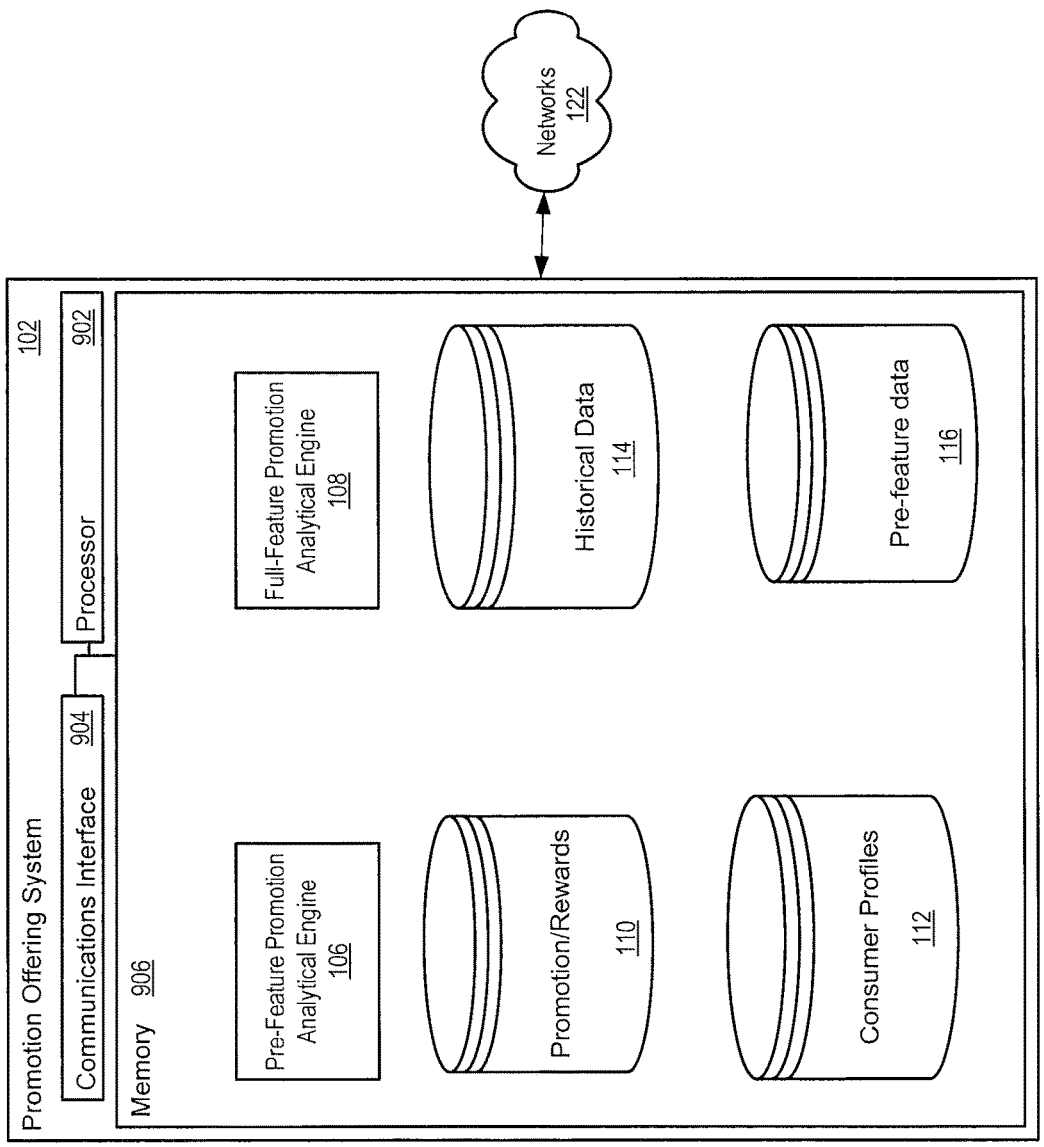
FIG. 9 shows the promotion offering system configuration.

FIG. 9 shows a promotion offering system 102 that includes a processor 902 and memory 906 coupled to a communications interface 904 through which the promotion offering system 102 communicates with various components of the promotion system configuration 100 in communication through a network 122 (e.g., the Internet). As discussed above, the promotion offering system 102 may access various databases, such as promotion/rewards database 110, consumer profiles database 112, historical data database 114, and pre-feature data database 116. The various databases may be resident in memory 906, as shown in FIG. 9, or may be external databases. Further, the pre-feature promotion analytical engine 106 (which includes the functionality disclosed in FIGS. 3-6) and the full-feature promotion analytical engine 108 (which includes the functionality disclosed in FIGS. 7-8) may be resident in memory 906.

The promotion offering system may be deployed as a general computer system used in a networked deployment. Likewise, the other components described in FIG. 1, including merchant 1 (118), merchant M (120), consumer 1 (124), and consumer N (126) may be general computer system as well configured to communicate with the promotion offering system. The computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include processor 902, such as, a central processing unit (CPU), a graphics processing unit (GPU), programmable logic array, or a combination thereof. The processor 902 may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories discussed herein, as well as the claims below, may be embodied in and implemented in one or multiple physical chips or circuit combinations. The processor may execute a software program, such as code generated manually (i.e., programmed).

The computer system may include memory 906 that can communicate via a bus. The memory 906 may be a main memory, a static memory, or a dynamic memory. The memory may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

Additionally, the computer system may include an input device configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit may include a computer-readable medium in which one or more sets of instructions, e.g. software, can be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed:

1. A method comprising:
identifying, via a processor, a pre-feature promotion for testing an initial set of consumers having a representative distribution across multiple values of a tested attribute to determine which specific value of the tested attribute of the multiple values of the tested attribute to determine a subsequent set of consumers to which a full-feature promotion will be sent, the pre-feature promotion comprising the tested attribute, the tested attribute being a range of distances representative of a distance to a consumer location from a location at which to redeem the promotion, the tested attribute grouped to one of a plurality of values, each of the plurality of values indicative of a specific range of distances,
generating, via the processor, test data for multiple consumer groupings, each representative of a different range of distances, by providing to each of the multiple consumer groupings, the pre-feature promotion comprised of the tested attribute having a different pre-determined value of the plurality of values,
wherein the generating of the test data comprises:
selecting, via the processor, from a consumer profiles database storing consumer attributes data describing a respective profile of each consumer of a group of consumers, a first set of the consumers to receive a first offer for the pre-feature promotion and calculating a distance to the consumer location from the location at which to redeem the promotion,
wherein the first set of the consumers exhibit a pre-determined distribution of the plurality of values, each of the plurality of values indicative of one specific range of distances, representative of a control population that exhibit a pre-determined distribution of values, such that each subset of the first set of consumers are located within the one specific range of the range of distances from the location at which to redeem the promotion, and wherein a particular number of consumers in each subset is dynamically determined according to meeting a representative proportion of the control population for each of the plurality of values indicative of one specific range of distances, and
sending, via a communication interface, the first offer for the pre-feature promotion to first set of the consumers via a push-type communication allowing feedback to be collected;
receiving, via the communication interface, feedback data from every consumer of the first set of the consumers, the feedback data including (1) acceptance of the first offer of the pre-feature promotion, (2) rejection of the first offer of the pre-feature promotion, (3) considered the first offer of the pre-feature promotion, and (4) did not consider the first offer of the pre-feature promotion, wherein the feedback data of 'did not consider' comprises receiving the push-type communication but failing to open the push-type communication with the pre-feature promotion or failing to click on a link to the webpage containing the pre-feature promotion, wherein the feedback of 'considered' comprises opening of the push-type communication containing the pre-feature promotion or clicking on the link in the push-type communication to access the webpage for the pre-feature promotion;

in response to receiving the feedback data from the first set of the consumers with respect to the first offer, selecting, via the processor, from the consumer profiles database, a second set of the consumers to receive an offer for the full-feature promotion, the full-feature promotion comprising a same discount value as the pre-feature promotion and the tested attribute, wherein the second set of the consumers is larger than the first set of consumers and exhibits a different distribution of the plurality of values of the test attribute than exhibited by the first set of consumers, and the different distribution of values based at least in part on the feedback data from the first set of consumers with respect to the first offer; and providing, via the communication interface, the full-feature promotion to the second set of consumers.

2. The method of claim 1, wherein selecting the first set of the consumers comprises randomly selecting consumers from the group of consumers.

3. The method of claim 1, wherein the pre-feature promotion is designed to investigate a consumer geographical distance attribute describing a distance between a location of a consumer and a location of the promotion, and wherein selecting the first set of consumers comprises: identifying a pre-determined set of geographical distance ranges from the location of the promotion; for each consumer in the group of consumers, calculating a distance between a location of the consumer and the location of the promotion; assigning the consumer to one of the set of geographical distance ranges using the calculated distance; and selecting the first set of the consumers based in part on their respectively assigned geographical distance range.

4. The method of claim 3, wherein selecting the first set of the consumers comprises randomly selecting consumers from the pre-determined set of geographical distance ranges.

5. The method of claim 3, wherein the representative distribution across the multiple values of the consumer attribute comprises a same number of consumers respectively selected from each of the pre-determined set of geographical distance ranges.

6. The method of claim 3, wherein selecting the first set of the consumers comprises selecting a predetermined number of consumers from at least one of the pre-determined set of geographical distance ranges.

7. The method of claim 1, wherein the size of the second set of the consumers is larger than the size of the first set of the consumers.

8. The method of claim 1, wherein selecting each of the second set of the consumers comprises:

generating a third probability of acceptance, for the consumer, of the offer for the promotion using the feedback data from the historical promotion programs; and adjusting the third probability of acceptance using the feedback data from the first set of the consumers with respect to the first offer.

9. A promotion offering system comprising:

a consumer profiles database configured to store consumer attributes data describing a respective profile of each of a group of consumers;

a communication interface; and a processor in communication with the consumer profiles database and the communication interface, the processor configured to:

identify a pre-feature promotion for testing an initial set of consumers having a representative distribution across multiple values of a tested attribute to determine which specific value of the tested attribute of the multiple values of the tested attribute to determine a subsequent set of consumers to which a full-feature promotion will be sent, the pre-feature promotion comprising the tested attribute, the tested attribute being a range of distances representative of a distance to a consumer location from a location at which to redeem the promotion, the tested attribute grouped to one of a plurality of values, each of the plurality of values indicative of a specific range of distances, generate test data for multiple consumer groupings, each representative of a different range of distances, by providing to each of the multiple consumer groupings, the pre-feature promotion comprised of the tested attribute having a different pre-determined value of the plurality of values, wherein the generating of the test data comprises:

select a first set of consumers, from the group of consumers, to receive a first offer for the pre-feature promotion and calculating a distance to the consumer location from the location at which to redeem the promotion, wherein the first set of the consumers exhibit a pre-determined distribution of the plurality of values, each of the plurality of values indicative of one specific range of distances, representative of a control population that exhibit a pre-determined distribution of values, such that each subset of the first set of consumers are located within the one specific range of the range of distances from the location at which to redeem the promotion, and wherein a particular number of consumers in each subset is dynamically determined according to meeting a representative proportion of the control population for each of the plurality of values indicative of one specific range of distances, and send, via the communication interface, the first offer for the pre feature promotion to the first set of the consumers via a push-type communication allowing feedback to be collected;

receive feedback data from every consumer of the first set of the consumers, the feedback data including (1) acceptance of the first offer of the pre-feature promotion, (2) rejection of the first offer of the pre-feature promotion, (3) considered the first offer of the pre-feature promotion, and (4) did not consider the first offer of the pre-feature promotion, wherein the feedback data of 'did not consider' comprises receiving the push-type communication but failing to open the push-type communication with the pre-feature promotion or failing to click on a link to the webpage containing the pre-feature promotion, wherein the feedback of 'considered' comprises opening of the push-type communication containing the pre-feature promotion or clicking on the link in the push-type communication to access the webpage for the pre-feature promotion;

in response to receiving the feedback data from the first set of the consumers with respect to the first offer, select, from the consumer profiles database, a second set of the consumers to receive an offer for the full-feature promotion, the full-feature promotion comprising a same discount value as the pre-feature promotion and the tested attribute, wherein the second set of the consumers is larger than the first set of consumers and exhibits a different distribution of the plurality of values of the test attribute than exhibited by the first set of consumers, and the different distribution of values based at least in part on the feedback data from the first set of consumers with respect to the first offer; and providing the full-feature promotion to the second set of consumers.

10. The promotion offering system of claim 9, wherein the processor is configured to select the first set of the consumers comprises randomly selecting consumers from the group of consumers.

11. The promotion offering system of claim 9, wherein the pre-feature promotion is designed to investigate a consumer geographical distance attribute describing a distance between a location of a consumer and a location of the promotion, and wherein selecting the first set of consumers comprises: identifying a pre-determined set of geographical distance ranges from the location of the promotion; for each consumer in the group of consumers, calculating a distance between a location of the consumer and the location of the promotion; assigning the consumer to one of the set of geographical distance ranges using the calculated distance; and selecting the first set of the consumers based in part on their respectively assigned geographical distance range.

12. The promotion offering system of claim 11, wherein selecting the first set of the consumers comprises randomly selecting consumers from the pre-determined set of geographical distance ranges.

13. The promotion offering system of claim 11, wherein the representative distribution across the multiple values of the consumer attribute comprises a same number of consumers respectively selected from each of the pre-determined set of geographical distance ranges.

14. The promotion offering system of claim 11, wherein selecting the first set of the consumers comprises selecting a predetermined number of consumers from at least one of the pre-determined set of geographical distance ranges.

15. The promotion offering system of claim 9, wherein the size of the second set of the consumers is larger than the size of the first set of the consumers.

16. The promotion offering system of claim 9, wherein selecting each of the second set of the consumers comprises:

generating a third probability of acceptance, for the consumer, of the offer for the promotion using the feedback data from the historical promotion programs; and adjusting the third probability of acceptance using the feedback data from the first set of the consumers with respect to the first offer.

* * * * *